Patented Jan. 22, 1946

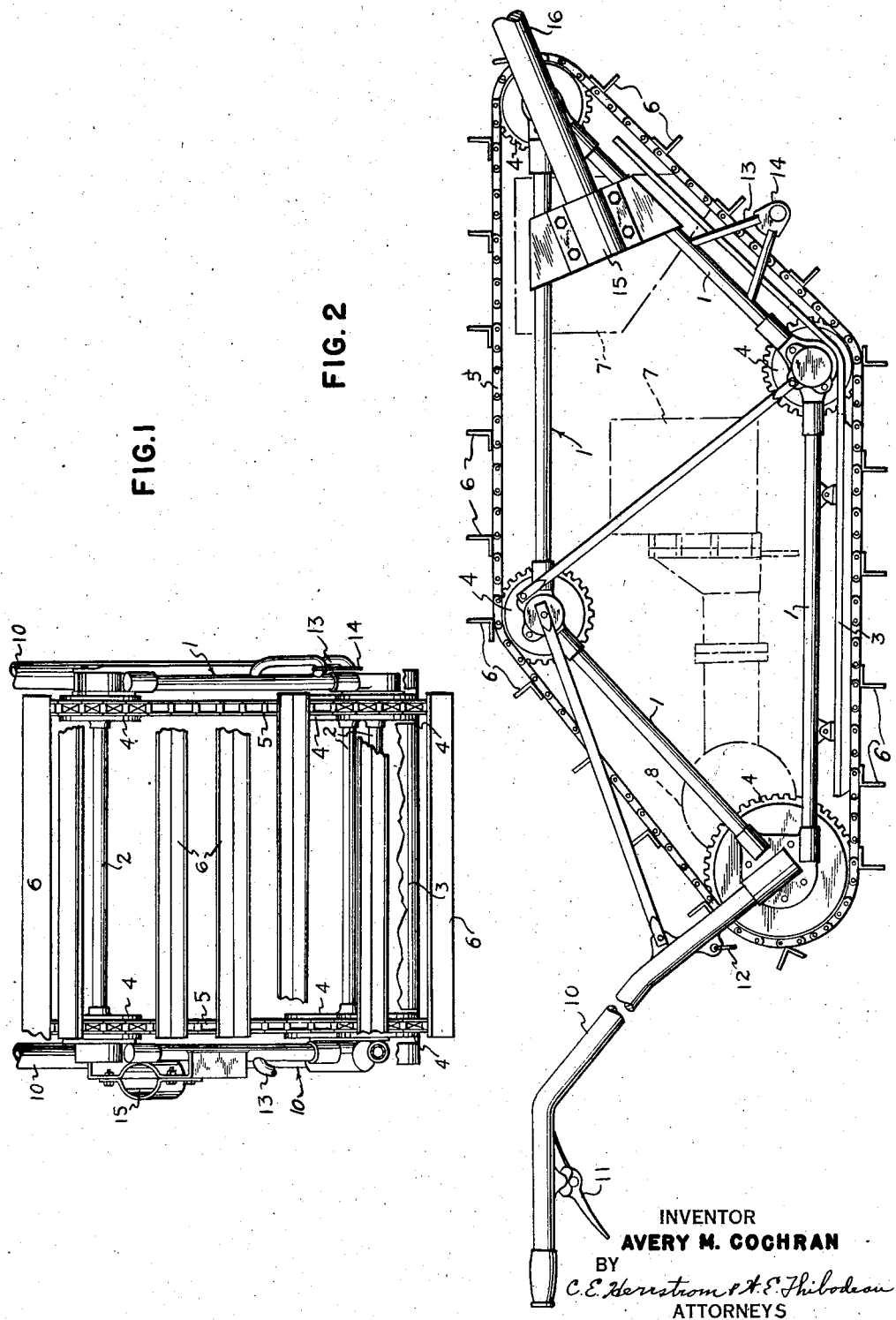

2,393,309

UNITED STATES PATENT OFFICE 2,393,309

SNOW TRACTOR

Avery M. Cochran, Camp Hale, Colo.

Application April 16, 1943, Serial No. 483,347

1 Claim. (Cl. 180—19)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel snow tractor and more particularly to one that can replace dogs as the motive power in hauling a load over a trail and similarly to replace snowshoers in breaking a new trail in fresh snow.

Ordinarily a trail in fresh snow is first broken by snowshoers. Frequently it must remain unused overnight in order to harden before it is serviceable. Such a trail is designed to be traveled by dog-drawn sleds or toboggans. This mode of transportation is difficult even under normal conditions. Due to the concentrated load on the feet of the dogs, especially on an incline, their legs sink into the snow and thus retard progress very materially. Moreover, special skill and understanding are required in handling the dogs. For example, the driver must know when they require rest for, if overworked, they become subject to stroke. In addition, food for the dogs must be carried, and the size of the pay load is reduced in proportion to the length of the trip.

The difficulties are greatly enlarged where the terrain is at all irregular. Even on level ground, one part of the sled may be on a softer surface than another part, causing the sled to tilt and requiring steering of the dogs, more effort by the dogs, or both. In fact, the density of the snow is more than likely than not to be non-uniform, and the tilting of the sled is more or less usual. Tilting also occurs on striking hard spots such as rocks and stumps.

The greatest difficulties are presented in breaking a trail or hauling a load across a fairly steep slope. In the latter case the loaded toboggans tend to slide down the slope and are maintained on their course by the use of gee poles. The dogs, however, are not so easily controlled while slipping and tugging. The driver can keep them on the course only by talking to them. This becomes increasingly difficult as the dogs grow tired, and only the most skillful driver can succeed in this operation. At best his control over the steering is indirect, incomplete and non-mechanical.

In alleviating these difficulties, the invention provides a power driven tractor to replace the dogs in hauling the load. It is also useful in breaking the trail. To accomplish these functions satisfactorily, I have found that the tractor must have certain definite properties. The bottom of the tractor should be of such construction and area, with respect to its weight, that its flotation in snow produces a fresh trail of approximately the same depth as a trail made by snowshoers. Such a trail will support the usual load consisting of laden toboggans preceded and steered individually by snowshoers holding the gee poles. Another important property is a center of gravity located rather close to the bottom in order to reduce the tilting. This is accomplished by mounting the power plant on the tractor in a low position. Another desirable feature is that the tractor, or the trail-making part thereof, has approximately the width of a snow-shoe trail, which is about twenty inches.

Finally, the steering means for the tractor is of great importance. A pair of handle bars extending longitudinally from the rear are provided for normal steering. In this connection a center of gravity located too far forward would increase the difficulty in steering; neither should it be too far rearward for this would increase the swaying. It has been found that the most desirable location of the center of gravity is slightly forward of the longitudinal center.

In traversing difficult terrain, as in crossing a slope, the handle bars at the rear are not sufficient to maintain the tractor on its course. To facilitate steering under such conditions, another manhandling means is provided at the front of the tractor. This may conveniently be a gee pole at the front end, whereby the tractor can be man-handled at both ends. In this way the steering is completely within the control of one or two men, as the case may be, and is no longer dependent upon such uncertainties as the temperament, fatigue and cooperation of a team of dogs.

The invention is fully disclosed by way of example in the following description and in the accompanying drawing in which:

Figure 1 is a front end view of the device, partly broken away, and

Figure 2 is a side elevation of the device.

Reference to these views will now be made by use of like characters which are employed to designate corresponding parts throughout.

In Figure 1 the tractor is illustrated as built on a suitable framework comprising, in this case, a pair of rectangular frames 1 made of tubing and joined by transverse bars or tubes 2. This structure in the illustrated embodiment rests on a toboggan bottom or skid plate 3.

Sprocket wheels 4 are suitably journaled at the eight corners of the framework, and over them are passed two chains 5. Grippers or flights 6 are secured across the chains in spaced relation to form a so-called open track. However, the specific construction of the track is not material and may be modified as already indicated.

The power plant is in the form of a gasoline motor designated by the numeral 7 and supplied with fuel from a tank 7'. It is operatively connected through gearing or a transmission 8 to rear lower wheels 4. The motor is preferably mounted low and slightly forward of the center of the skid plate 3 to facilitate steering and to reduce tilting and swaying. The weight of the tractor is 300 to 400 pounds.

The flotation of the tractor is such that it makes a trail in fresh snow having approximately the same width and depth as one made by snowshoers in the usual manner. The trail is thus adapted to carry the usual loads.

Handle bars 10 are extended rearwardly from the framework, preferably its lower portion, and are provided at the upper ends with control levers 11 linked to the motor. Rings 12 are attached near the lower ends of the bars 10 for towing a toboggan or a train of them. Similarly, a bracket 13 on the forward part of the framework carries a ring 14 for a towing bridle. Finally, a socket 15 is mounted on the framework, preferably at the upper forward corner of the right hand side, to receive a gee pole 16, extending a sufficient distance upwardly beyond the upper laps of the chains 5.

The operation of the device will be briefly reviewed. The operator stands behind the tractor and holds the upper end of the handle bars 10. He may use the handle bars for steering, except on difficult terrain, by rocking the tractor on its rear end and swinging it right or left. On more difficult terrain, especially where the tractor is likely to slip, another man works on the gee pole. Thus, the tractor is man-handled at both ends and is kept on its course entirely by man power.

Although a specific embodiment of the invention has been illustrated and described, it will be understood that various alterations in the details of construction may be made without departing from the scope of the invention as indicated by the appended claim.

What I claim is:

A self-propelled tractor comprising a light, comparatively high, rhomboidal shaped frame having the upper forward end thereof projecting outwardly, sprocket wheels disposed on each corner of said frame, a comparatively wide light track substantially the width of said frame engaging said sprockets and movable around said frame, power means within said frame for moving said track, and angularly extending handle bars projecting from the lower rear corner of said frame for manually handling said tractor, said frame and track shielding said power means in said frame.

AVERY M. COCHRAN.